July 4, 1939.     P. M. G. TOULON     2,165,078

TELEVISION RECEIVING SET

Filed Nov. 6, 1936

INVENTOR
PIERRE MARIE GABRIEL TOULON
BY *H S Grover*
ATTORNEY

Patented July 4, 1939

2,165,078

UNITED STATES PATENT OFFICE 2,165,078

TELEVISION RECEIVING SET

Pierre Marie Gabriel Toulon, Puteaux, France, assignor to Radio Corporation of America, a corporation of Delaware Application November 6, 1936, Serial No. 109,476
In France November 6, 1935

2 Claims. (Cl. 178—7.5)

The television receiving screens which actually consist of the fluorescent wall of cathode-ray oscillographs are always very small. In order to be able to follow comfortably the transmitted picture, it is necessary to increase that picture and to move it away from the observer. It has been already proposed to place magnifying glasses in front of the oscillograph screen, but the effect obtained in this manner is always restricted and the screen can be observed only by a very small number of spectators. It has been also proposed to project the real image of the screen on a diffusing surface, but there the lack in luminosity has interfered with progress.

The present invention constitutes a new solution of that problem, and permits, starting from a cathode-ray oscillograph, the luminous part of which amounts to a few square centimeters, to obtain an image, the apparent dimensions of which amount to several meters, so that the observer can enjoy them without effort in his visual accommodation. The magnification is obtained either by means of suitably-built concave mirrors that are especially arranged, or by means of convex glasses that are integral with a reservoir containing a liquid, the index of refraction of which differs from that of the atmosphere.

In both cases, the observer examines a virtual image at a relatively small angle, which image is nearly always located at an "infinite" distance. The attached figures, which are given by way of non-limiting examples, show the importance of the invention and represent constructive arrangements which have been worked out for its elaboration.

Figure 1:
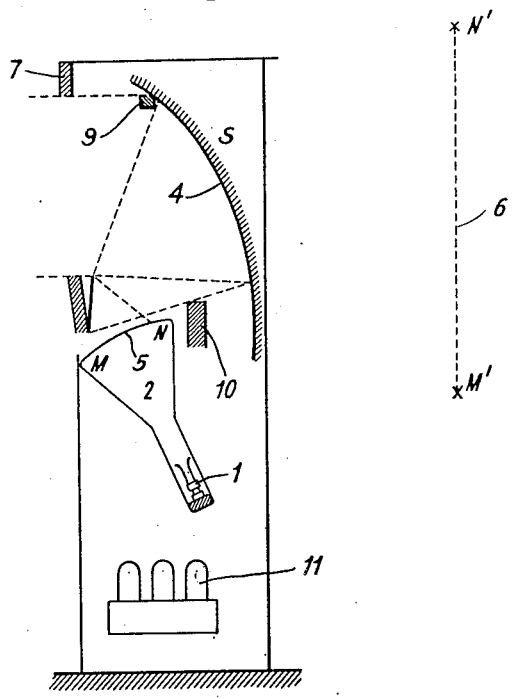
Fig. 1 represents a concave mirror, which permits obtaining a very enlarged virtual image of the screen and of producing at the same time an illusion of relief.

As Fig. 1 represents, the cathode-ray oscillograph is arranged preferably vertically. The body of the oscillograph 2 is mounted on a housing, the electron gun 1 being placed at the lower part and the fluorescing screen 5 to the upper part. A plane mirror 3 sends light rays to the concave mirror 4 and then in the direction of the observer's eyes. The latter examines through an opening 7—8 the virtual image 6 which is very enlarged and which takes the place of the small screen 5. This image M'—N' reproduces faithfully the image M—N$n$, but seems to be located several meters back of the screen, although its luminosity remains the same. An auxiliary screen 9—10 limits the apparent dimensions of the concave mirror. By virtue of the presence of the screens which are placed one behind the other (7—8 and 9—10), the image M'—N' seems to be endowed with relief. The amplifier 11 is mounted at the lower part of the cabinet.

Figure 2:
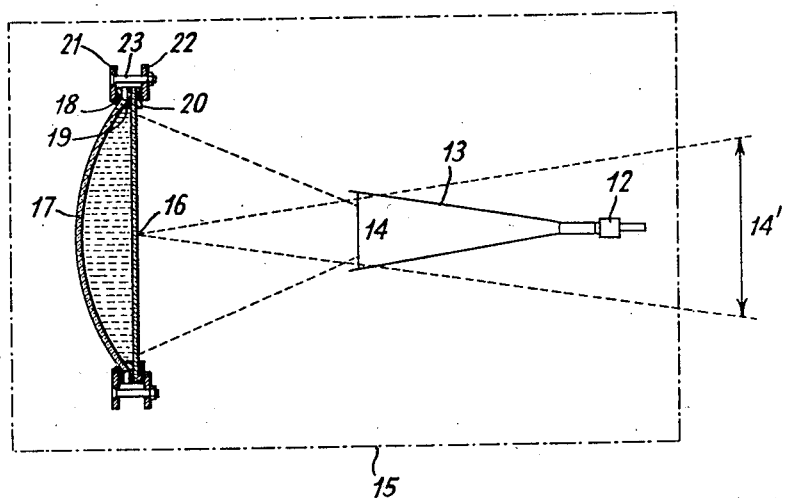
Fig. 2 shows how the utilization of an optical system that produces an enlarged vertical image constitutes the solution of the problem of building a very large apparent screen, so that the spectators may enjoy the showing of pictures, the size of which is not out of proportion with the intensity of sound furnished by the loudspeaker.

Fig. 2 represents another arrangement which permits building a lens of considerable dimensions, which at the same time operates very economically.

It is known that the dimension of the lens must be very large so that the observer may occupy, in the room, any position. The making of lenses with a diameter of 0.80 meter, for example, would require a price which could not be even approached.

The invention permits the economic realization of a lens by means of a liquid with a high index of refraction. The oscillograph 13 with its electron gun 12 and its screen 14 is arranged in front of the mounting 22, in which are mounted a plane glass 16 and a curved glass 17. The interval between the plane glass and the convex glass is filled with a liquid. Rubber sheets 18, 19 and 20 insure the hermetic tightness of the device. The two glasses are fastened one against the other by means of washers 21 and 22 which are tightened by means of bolts 23. One can observe an enlarged virtual image 14'.

As liquid, one can use oil, for instance, paraffin oil, as well as vaseline oil, the index of refraction of which comes close to that of glass, and which remains unchanged.

I claim:

1. A system to produce reflected representations of electro-optical images developed by an electron tube which comprises a first reflecting element adapted to receive the optical image from the electron tube and to reflect the said image according to a first predetermined path of reflection, a second reflecting surface positioned in the path of the first reflection to direct the reflected image along a second predetermined path of reflection, a cabinet having a viewing window, means for locating the reflectors within the cabinet so that the second reflecting path coincides with the viewing window and the second reflecting element is recessed within the cabinet so as to be substantially shielded from illumination external to the cabinet, and an image size masking means positioned intermediate the electron tube and the viewing window to limit the apparent dimensions of the second reflecting element and to confine the developed image to predetermined boundaries.

2. A system to produce reflected representations of electro-optical images developed by an electron tube which comprises a housing cabinet, an electronic scanning tube for producing electro-optical image representations, a first reflecting element supported within the cabinet and positioned to receive the optical image from the electron tube and to reflect the image according to a first predetermined path of reflection, a concave reflecting surface supported within the cabinet and positioned in the path of the first reflection to direct the reflected image along a second predetermined path of reflection, said concave reflector being so located and positioned within the housing cabinet as to be completely shielded from external light except for the viewing direction thereof, said concave reflecting surface being adapted to produce a virtual image of the electro-optical image developed within the tube with the image apparently located rearwardly of the surface of the concave reflecting surface, said housing cabinet having a viewing window located in alignment with the concave reflecting element for permitting observation of the produced virtual image, and an image size masking means positioned intermediate the electron tube and the viewing window to limit the apparent dimensions of the second reflecting element and to confine the developed image to predetermined boundaries.

PIERRE MARIE GABRIEL TOULON